(12) United States Patent
Kupratis et al.

(10) Patent No.: US 11,041,462 B2
(45) Date of Patent: Jun. 22, 2021

(54) HYBRID TURBOFAN WITH DIFFERENTIAL ELECTRICAL AND MECHANICAL POWER TRANSFER

(71) Applicant: United Technologies Corporation, Farmington, CT (US)

(72) Inventors: Daniel Bernard Kupratis, Wallingford, CT (US); Mark Tu, East Hampton, CT (US)

(73) Assignee: Raytheon Technologies Corporation, Farmington, CT (US)

(*) Notice: Subject to any disclaimer, the term of this patent is extended or adjusted under 35 U.S.C. 154(b) by 66 days.

(21) Appl. No.: 16/432,449

(22) Filed: Jun. 5, 2019

(65) Prior Publication Data
US 2020/0386188 A1   Dec. 10, 2020

(51) Int. Cl.
*F02C 7/36* (2006.01)
*F02K 3/06* (2006.01)

(52) U.S. Cl.
CPC .............. *F02K 3/06* (2013.01); *F02C 7/36* (2013.01); *F05D 2220/323* (2013.01); *F05D 2220/36* (2013.01); *F05D 2260/40311* (2013.01)

(58) Field of Classification Search
CPC ..... F02K 3/06; F02C 7/36; F05D 2260/40311
See application file for complete search history.

(56) References Cited

U.S. PATENT DOCUMENTS

| | | | |
|---|---|---|---|
| 4,005,575 A * | 2/1977 | Scott | F02C 9/18 60/226.1 |
| 4,251,987 A * | 2/1981 | Adamson | F02K 3/04 60/805 |
| 4,827,712 A * | 5/1989 | Coplin | F02K 3/06 415/210.1 |
| 5,010,729 A * | 4/1991 | Adamson | F02C 3/107 60/226.1 |
| 10,018,119 B2 | 7/2018 | Kupratis et al. | |
| 2006/0034693 A1 | 2/2006 | Lardellier | |
| 2008/0060341 A1* | 3/2008 | Loisy | F02K 3/02 60/226.1 |
| 2012/0153076 A1* | 6/2012 | Burns | B64D 41/00 244/58 |
| 2014/0064915 A1 | 3/2014 | Masson et al. | |
| 2014/0250860 A1 | 9/2014 | Sidelkovskiy | |
| 2014/0290265 A1 | 10/2014 | Ullyott et al. | |

(Continued)

FOREIGN PATENT DOCUMENTS

| | | |
|---|---|---|
| EP | 3290680 A1 | 3/2018 |
| WO | 9502120 A1 | 1/1995 |
| WO | 2008082336 A1 | 7/2008 |

OTHER PUBLICATIONS

European Search Report for European Application No. 20178610.0 dated Nov. 10, 2020.

*Primary Examiner* — Steven M Sutherland
(74) *Attorney, Agent, or Firm* — Carlson, Gaskey & Olds, P.C.

(57) ABSTRACT

A turbofan engine includes a fan section including a plurality of fan blades, a first spool including a first turbine section, a second spool including a second turbine section, a first electric machine, and a second electric machine. A gear system is coupled between the first spool, the second spool, the first electric machine, the second electric machine and the fan section for driving the fan section.

21 Claims, 4 Drawing Sheets

(56) References Cited

U.S. PATENT DOCUMENTS

2015/0354502 A1* 12/2015 Kuhne .................... F02C 7/36
  60/226.1
2018/0149091 A1   5/2018 Howell et al.
2018/0202368 A1   7/2018 Suciu et al.

* cited by examiner

HYBRID TURBOFAN WITH DIFFERENTIAL ELECTRICAL AND MECHANICAL POWER TRANSFER

BACKGROUND

A turbofan engine typically includes a fan section, a compressor section, a combustor section and a turbine section. The turbofan engine may include independently rotatable spools driven by corresponding independently rotatable turbine sections. Transfer of power between the independent spools may enable increases in engine operating efficiencies. Moreover, incorporation of electric motors to augment power transfer may further improve engine operating efficiencies.

Turbofan engine manufacturers continue to seek improvements to engine performance power transfer and propulsive efficiencies.

SUMMARY

A turbofan engine according to an exemplary embodiment of this disclosure includes, among other possible things, a fan section including a plurality of fan blades, a first spool including a first turbine section, a second spool including a second turbine section, a first electric machine, and a second electric machine. A gear system is coupled between the first spool, the second spool, the first electric machine, the second electric machine and the fan section for driving the fan section.

In a further embodiment of the foregoing turbofan engine, the gear system comprises a differential gear system including a plurality of spider gears supported in a differential carrier, a fan output gear driven by the plurality of spider gears, a first input shaft configured to drive the differential carrier and an input gear coupled to drive the plurality of spider gears.

In a further embodiment of any of the foregoing turbofan engines, the first input shaft is coupled to the first spool and the input gear is coupled to the second spool.

In a further embodiment of any of the foregoing turbofan engines, the gear system includes an epicyclic gear box which includes a sun gear driven by a first spool. The sun gear is coupled to drive a plurality of planet gears supported within a carrier and a ring gear circumscribing the plurality of planet gears and an output of the epicyclical gear box coupled to drive the differential carrier.

In a further embodiment of any of the foregoing turbofan engines, the ring gear is fixed to a static engine structure and the carrier provides the output to drive the differential carrier.

In a further embodiment of any of the foregoing turbofan engines, the carrier is fixed to a static engine structure and the ring gear provides the output to drive the differential carrier.

In a further embodiment of any of the foregoing turbofan engines, the fan section includes a fan shaft coupled to the fan output gear and the first electric machine.

In a further embodiment of any of the foregoing turbofan engines, the second electric machine is coupled to the first spool.

In a further embodiment of any of the foregoing turbofan engines, the first electric machine is an electric motor configured to drive the fan shaft and the second electric machine is an electric motor configured to drive the first spool.

In a further embodiment of any of the foregoing turbofan engines, an electrical bus is electrically coupled to the first electric machine and the second electric machine.

In a further embodiment of any of the foregoing turbofan engines, the electrical bus includes an AC Bus and a DC Bus.

Another turbofan engine according to an exemplary embodiment of this disclosure includes, among other possible things, a fan section including a fan shaft and a plurality of fan blades, a high speed spool including a high pressure turbine section and a low speed spool including a low pressure turbine section. A differential gearbox includes a plurality of spider gears supported in a differential carrier. The fan shaft is driven by the plurality of spider gears and an input gear driven by the low speed spool. An epicyclic gearbox includes a sun gear driven by the high speed spool. The sun gear drives a plurality of intermediate gears supported within a carrier and a ring gear circumscribing the plurality of intermediate gears. The epicyclic gearbox includes an output configured to drive the differential carrier, a first electric machine coupled to the fan shaft, and a second electric machine coupled to the high speed spool.

In a further embodiment of the foregoing turbofan engine, the ring gear is fixed to an engine static structure and the carrier is coupled to drive the differential carrier.

In a further embodiment of any of the foregoing turbofan engines, the carrier is fixed to an engine static structure and the ring gear is coupled to drive the differential carrier.

In a further embodiment of any of the foregoing turbofan engines, a low pressure compressor is coupled to fan shaft to rotate at a speed common with the fan section.

In a further embodiment of any of the foregoing turbofan engines, a first tower shaft couples the first electric machine to the fan shaft and a second tower shaft couples the second electric machine to the high speed spool.

In a further embodiment of any of the foregoing turbofan engines, a first clutch selectively decouples the first electric machine from the fan shaft and a second clutch selectively decouples the second electric machine from the high speed spool.

A method of operating a turbofan engine according to an exemplary embodiment of this disclosure includes, among other possible things, coupling a fan shaft gear to a plurality of spider gears of a differential gearbox, supporting the plurality of spider gears with a rotatable differential carrier, and coupling a first spool to drive the rotatable differential carrier and a second spool to an input shaft configured to drive the plurality of spider gears. A fan section drives through the fan shaft gear with a combination of a first rotational input from the first spool into the differential carrier and a second rotational input from the second spool to the input shaft. The fan section is driven at a speed different than a speed of the first spool and the second spool responsive to the first rotational input and the second rotational input.

In a further embodiment of the foregoing method of operating a turbofan engine, a first electric motor is coupled to the fan shaft and provides a rotational input into the fan shaft independent of the first spool and the second spool.

In a further embodiment of any of the foregoing methods of operating a turbofan engine, a second electric motor is coupled to the first spool and provides a rotational input into the first spool.

In a further embodiment of any of the foregoing methods of operating a turbofan engine, a third rotational input is provided with the first electric motor to drive the fan shaft in the absence of the first rotational input from the first spool and the second rotational input from the second spool.

In a further embodiment of any of the foregoing methods of operating a turbofan engine, a speed of the fan is controlled by varying a rotational input from one or both of the first electric motor and the second electric motor.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
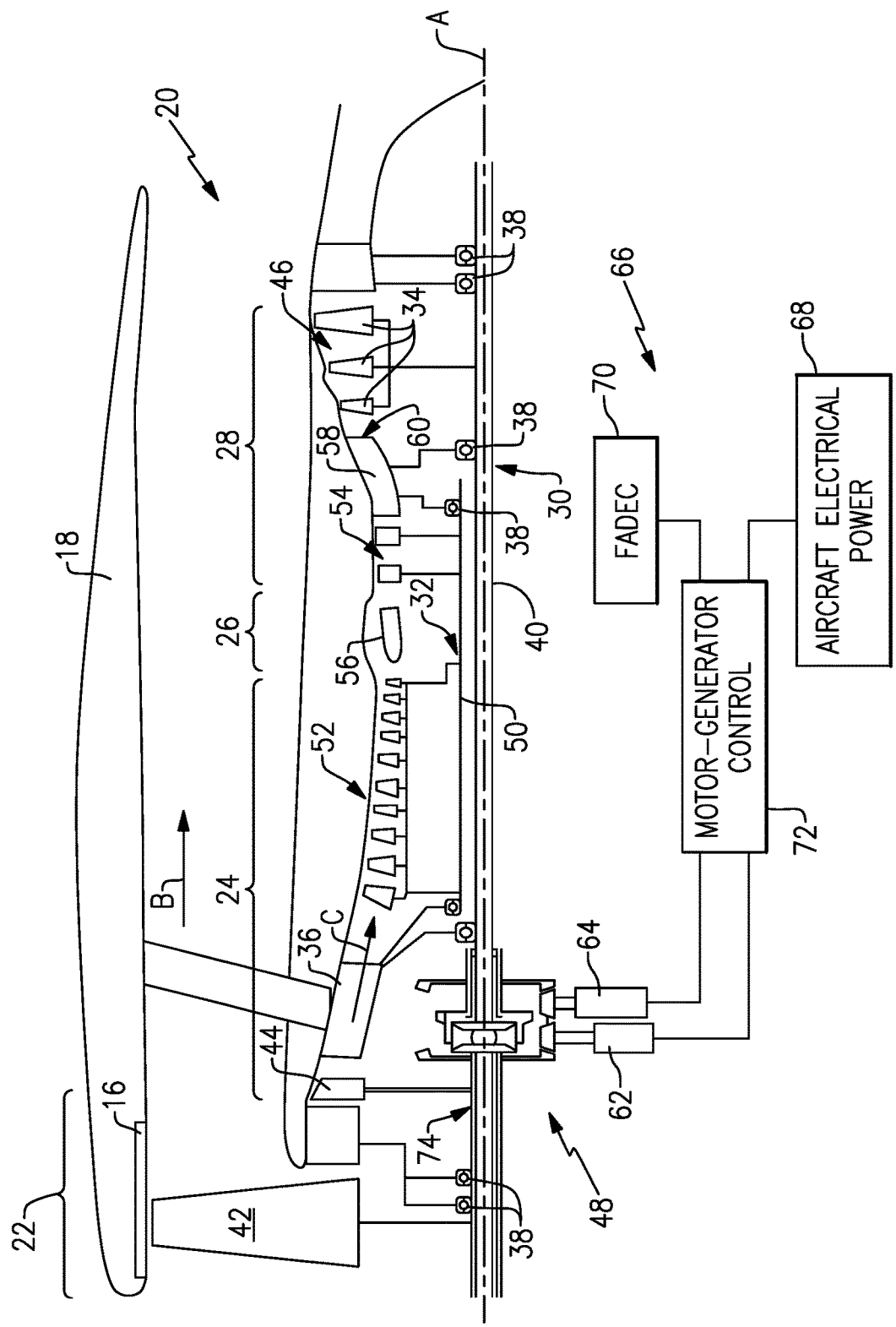
FIG. 1 is a schematic view of an example turbofan engine.

FIG. 1 schematically illustrates a turbofan engine 20. The hybrid turbofan engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 18, and also drives air along a core flow path C for compression and communication into the combustor section 26 then expansion through the turbine section 28. The fan section 22 includes a plurality of fan blades 42 that rotate within a fan case 16.

Although depicted as a two-spool turbofan engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that the bearing systems 38 may be provided at various locations as appropriate to the application.

The low speed spool 30 generally includes an inner shaft 40 that interconnects, a gear system 48 and a first (or low) pressure turbine 46. The inner shaft 40 is connected to the fan section 22. The high speed spool 32 includes an outer shaft 50 that interconnects a second (or high) pressure compressor 52 and a second (or high) pressure turbine 54. A gear system 48 is coupled to both the high speed spool 32 and the low speed spool 30 to drive the fan section 22 at a lower speed than both the low speed spool 30 and the high speed spool 32. A combustor 56 is arranged in exemplary engine 20 between the high pressure compressor 52 and the high pressure turbine 54. A mid-turbine frame 58 of the engine static structure 36 may be arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56 to generate a high energy gas flow that is then expanded through the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion of the high energy gas flow. It will be appreciated that each of the positions of the fan section 22, compressor section 24, combustor section 26, turbine section 28, and gear system 48 may be varied.

The engine 20 in one example is a high-bypass geared aircraft engine. In a further example, the engine 20 bypass ratio is greater than about six (6), with an example embodiment being greater than about ten (10), the geared system 48 includes both a differential gear system and an epicyclic gear train, such as a planetary gear system or other gear system, with a gear reduction ratio. The low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^0.5$. The "Low corrected fan tip speed" as disclosed herein according to one non-limiting embodiment is less than about 1150 ft/second (350.5 meters/second).

The example turbofan engine includes the fan section 22 that comprises in one non-limiting embodiment less than about 26 fan blades 42. In another non-limiting embodiment, the fan section 22 includes less than about 20 fan blades 42. Moreover, in one disclosed embodiment the low pressure turbine 46 includes no more than about 6 turbine rotors schematically indicated at 34. In another non-limiting example embodiment, the low pressure turbine 46 includes about 3 turbine rotors.

The gear system 48 is coupled to both the low speeds spool 30 and the high speed spool 32 such that power from both spools 30, 32 is utilized to drive the fan section 22. A first electric machine 62 and a second electric machine are also coupled to the gear system 48 to augment power provided to the fan section 22. Moreover, the first electric machine 62 and the second electric machine 64 may be operated to bypass the gear system 48 and drive the fan section 22.

The first and second electric machines 62, 64 are motor/generators. The electric machines 62, 64 can be operated as electric motors input power into the gear system 48 and thereby the spools 30, 32 and the fan section 22. The first and second electric machines may also be operated as generators driven by input from the spools 30, 32 to generate electric power utilized by the engine 20 and aircraft. A control system 66 includes a motor-generator control 72 that receives information from an engine controller or FADEC (Full Authority Digital Engine Control) 70. The control system 66 may also be controlled to route power to an aircraft electrical power system schematically shown at 68. The control system 66 shown in FIG. 1 will include additional electrical control components and devices.

Figure 2:
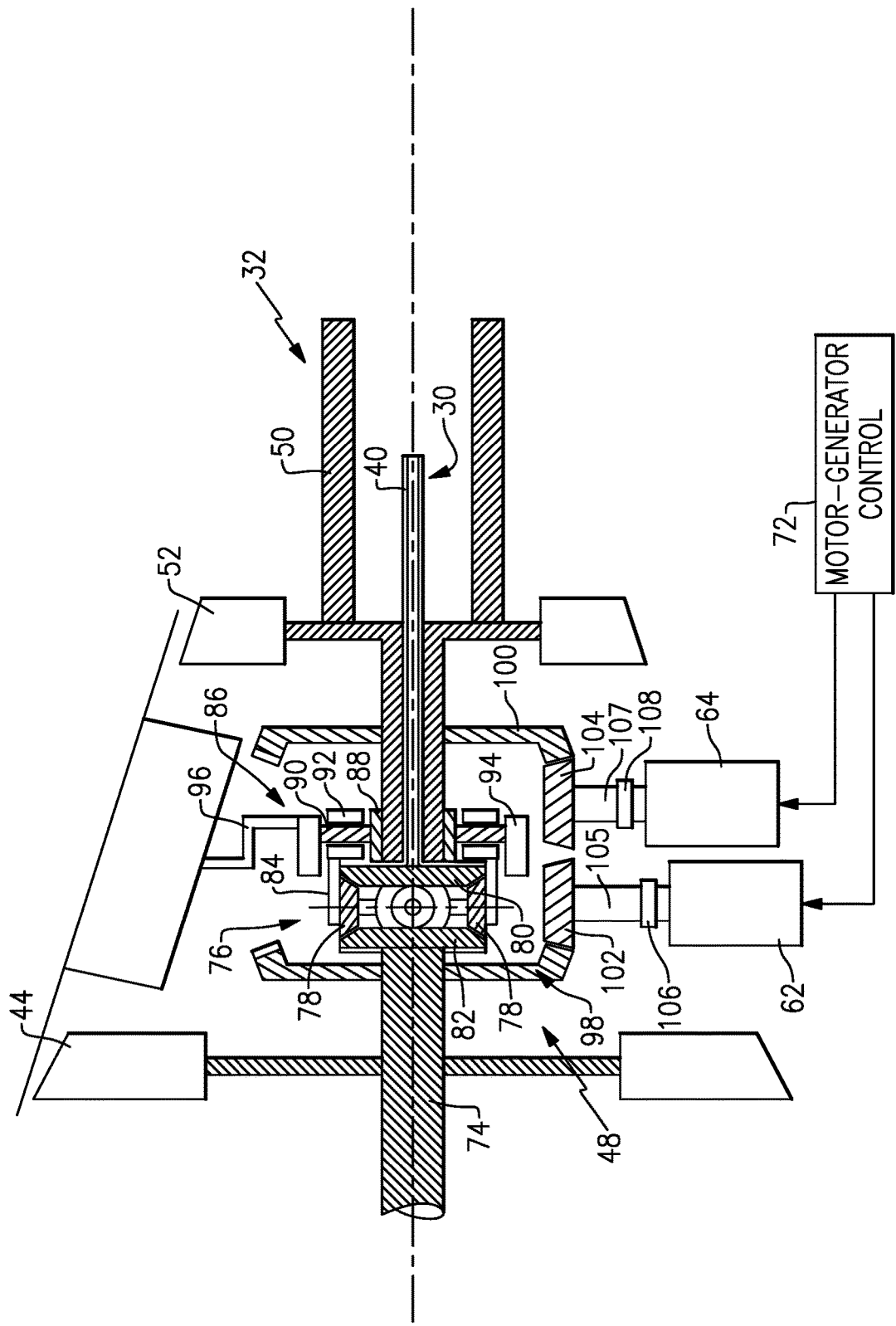
FIG. 2 is an enlarged view of an example gear system embodiment.

Referring to FIG. 2 with continued reference to FIG. 1, the example gear system 48 includes a differential gear system 76 and an epicyclic gear box 86. The differential gear system 76 includes a plurality of spider gears 78 supported in a differential carrier 84. A fan drive gear 82 is coupled to a fan shaft 74 and is driven by the spider gears 78. An input gear 80 is coupled to the inner shaft 40 driven by the low speed spool 30. In this example, the low pressure compressor 44 is coupled to the fan shaft 74 to rotate at the same speed as the fan section 22. The differential carrier 84 is coupled to the outer shaft 50 driven by the high speed spool 32. Accordingly, both the low speed spool 30 and the high speed spool 32 provide an input to the differential gear system 76 to drive the fan section 22 and the low pressure compressor 44.

The epicyclic gear box 86 is coupled to the differential gear system 76 through a connection between the differential carrier 84 and a carrier 92 of the epicyclic gear box 86. The example gear box 86 has a fixed ring gear 94 and is referred to as a planetary gear system. The epicyclic gear box 86 includes a sun gear 88 driven by the outer shaft 50 about the longitudinal axis A. The sun gear 88 drives a plurality of intermediate gears 90 supported in the carrier 92. The ring gear 94 circumscribes the plurality of intermediate gears 90 and is fixed relative to rotation of the carrier 92 by a fixed link 96. The epicyclic gear box 86 provides a speed reduction between the speed of the high speed spool 32 and the differential gear system 76 to provide power to drive the fan section 22. The speed reduction provided by the epicyclic gear box 86 is provided at a reduction ratio determined to provide the desired input of power to drive the fan section 22 at predefined speed in combination with inputs form the low speed spool 30. In one example embodiment, the epicyclic gear box 86 provides a speed reduction from 2.3:1 and 5.5:1 between the input to the sun gear 88 and the output through the carrier 92. It should be appreciated, that the epicyclic gear box 86 may be configured to provide other ranges of speed reduction and are within the contemplation of this disclosure.

A first gear 98 is coupled to the fan shaft 74 and the first electric machine 62 through a first tower shaft 105. A second gear 100 is coupled to the outer shaft 50 and the second electric machine through a second tower shaft 107. In the disclosed example, the first tower shaft 105 and the second dower shaft 107 are perpendicular to the engine longitudinal axis A. However, the first tower shaft 105 and the second tower shaft 107 may be angled or canted relative to the engine axis A. Moreover, the first tower shaft 105 and the second tower shaft 107 may be disposed at different circumferential positions about the engine longitudinal axis.

Moreover, although tower shafts 105, 107 are shown by way of example, other gear system configurations could be utilized and are within the contemplation and scope of this disclosure.

A first clutch 106 may be provided to selectively couple and decouple the first electric machine 62 to the fan shaft 74. A second clutch 108 may be provided to selectively couple and decouple the second electric machine to the outer shaft 50.

The gear system 48 includes multiple inputs from both the low spool 30 and the high spool 32. The multiple inputs enable the fan section 22 to spool up quicker. The faster spool up of the fan section 22 is provided because during starting operations, the high speed spool 32 typically achieves operating speeds prior to the low speed spool 30. Because power to drive the gear system 48 and thereby the fan section 22 is provided by both the low speed spool 30 and the high speed spool 32, a response to a desired change in a speed of the fan section 22 is faster. Moreover, slowing the fan section 22 can also be faster because the low speed spool 30 will decelerate faster than the high speed spool 32.

The electric machines 62, 64 are operated to input additional power into the gear system 48 to adjust operation and enable faster transitions between engine operating conditions. The electric machines 62, 64 can be operated to input additional torque to the fan section 22 and the high speed spool 32 to further enable faster response of the fan section 22. Additionally, the electric machines 62 and 64 can draw power from the gear system 48 to enable faster deceleration of the fan section 22 and the high speed spool 32.

Additionally, the second electric machine 64 can be operated to drive the high speed spool 32 during starting operations. The first electric motor 62 can be decoupled from the fan shaft 74 by the first clutch 106 such that the stating operation does not force rotation of the first electric machine.

Moreover, the coupling of the first and second electric motors 62, 64 enables the selective transfer of power between the spools 30, 32. Power may also be input into the gear system 48 by selective combination and control of the electric motors 62, 64.

Figure 3:
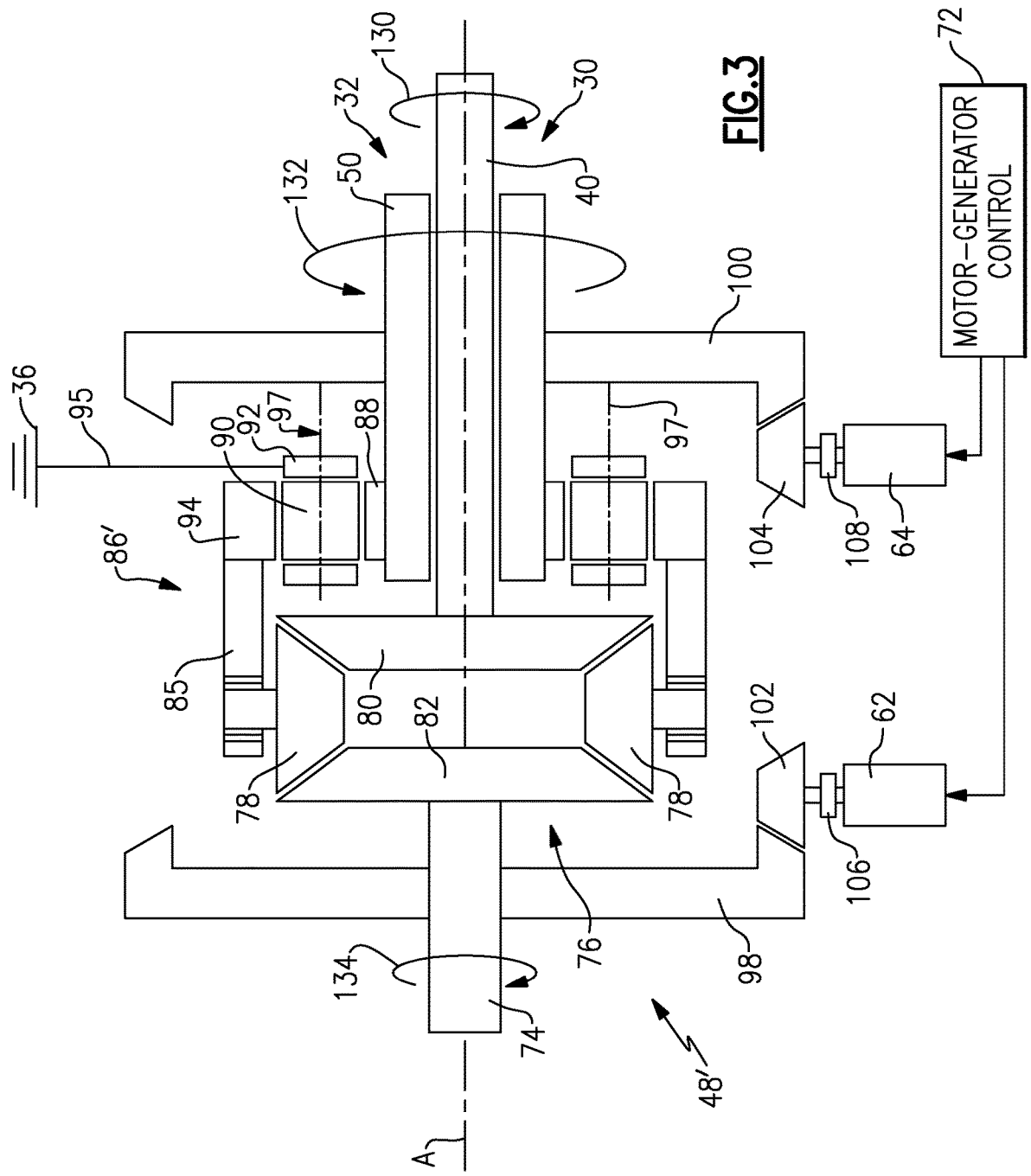
FIG. 3 is an enlarged view of another example gear system embodiment.

Referring to FIG. 3, another gear system 48' is schematically shown and includes an epicyclic gear box 86' with the ring gear 94 coupled to a differential carrier 85 to the differential gear system 76. The gear box 86' includes intermediate gears 90 coupled to the sun gear 88 and supported within a fixed carrier 92. The carrier 92 is fixed through a link 95 to an engine static structure 36 such that an axis of rotation 97 for each intermediate gear 90 is fixed relative to rotation of both the high pressure spool 32 and the low pressure spool 30. The gear box 86' shown in FIG. 3 is a star epicyclic gear system. The star gear system 86' may be configured through specific sizing of the sun gear 88, intermediate gears 90 and the ring gear 94 to provide a desired gear ratio to provide for a desired rotational speed of the fan section 22. In one disclosed embodiment, the epicyclic gear system 86' provides a gear reduction between 1.8:1 and 3.5:1 between the low spool 30 and the high spool 32.

The high pressure spool 32 drives the sun gear 88 in a first rotational direction indicated by arrow 132. The low speed spool 30 drives the input gear 80 of the differential gear system in a second rotational direction 130 that is opposite the first direction in this disclosed example. The fan shaft is driven by the differential gear system 76 in a third rotational direction 134 that is the same as the second rotational direction 130. It should be appreciated, that although the high pressure spool 32 and the low pressure spool are disclosed in FIG. 3 as counter-rotating the spools 30 and 32 may also co-rotate and is within the contemplation of this disclosure.

The first electric machine 62 and the second electric machine 64 are coupled to the fan shaft 74 and the outer shaft 50, respectively and operate in the same manner as described above with regard to the example gear system 48 shown in FIG. 2.

Figure 4:
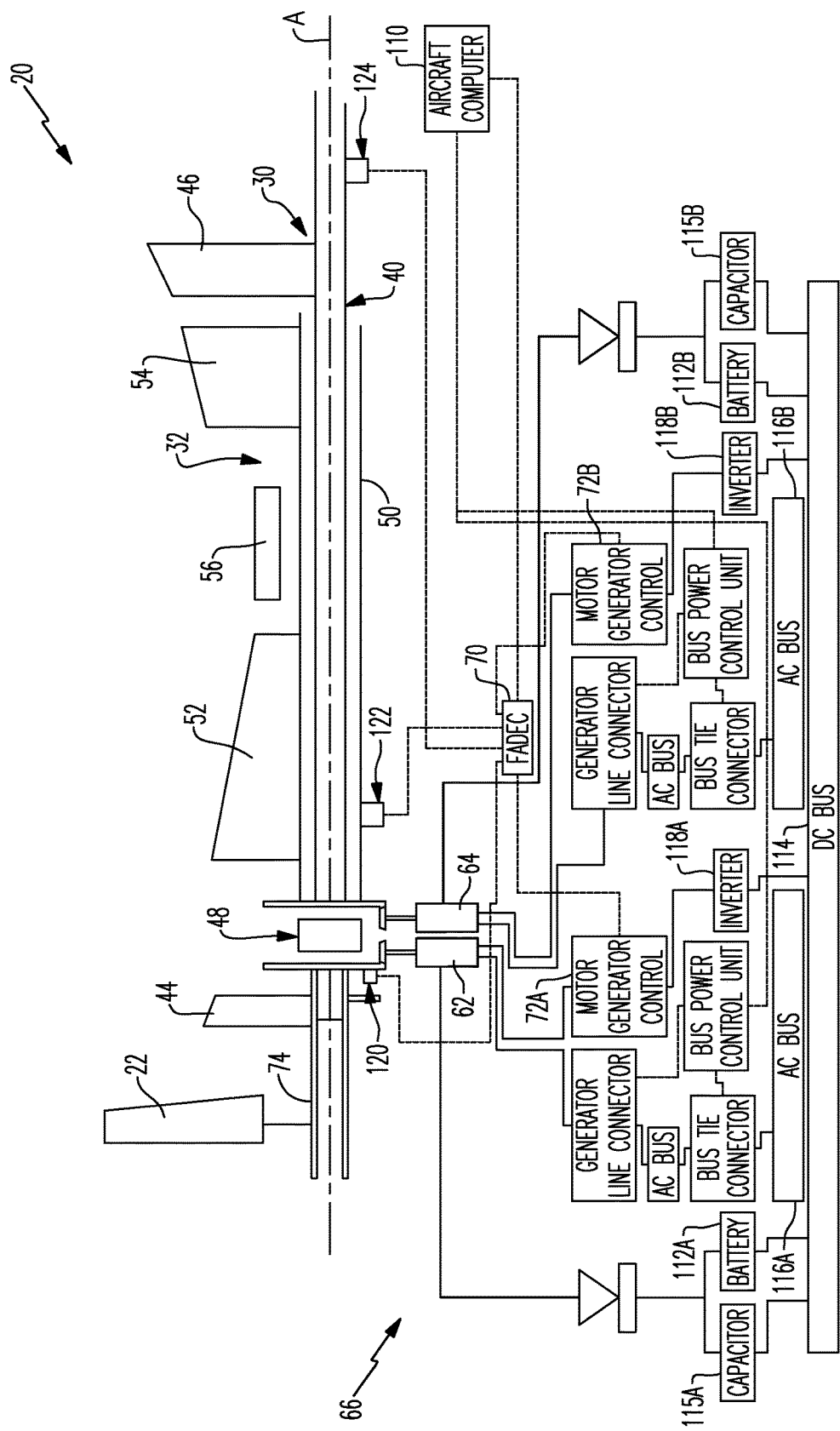
FIG. 4 is a schematic view of an example control system for the turbofan engine.

Referring to FIG. 4, with continued reference to FIGS. 1, 2 and 3, an example control system embodiment 66 is shown to include features that couple the electric machines to an AC Bus 116A-B and/or a DC bus 114. The controls system 66 includes separate motor-generator controls 72A, 72B for a corresponding one of the first electric machine 62 and the second electric machine 64. The example control system 66 further includes batteries 112A, 112B with accompanying capacitors 115A, and 115B in communication with the DC Bus 114 to both provide power to the electric machines 62, 64 and to enable charging depending on the engine operation. The control system 66 further includes inverters 118A, 118B to provide any needed conversion of power to enable communication between the electric machines 62, 64, and the DC bus 114. Other features of the control system 66 as are required to operate and control the electric machines 62, 64 are schematically shown by way of an example. Other electrical control devices and features as are required to operate the electric machines 62, 64 as an electric motor and/or a generator are contemplated and within the scope of this disclosure.

The control system 66 uses information from speed sensors and other measurement instruments located throughout the engine 20 to control operation of the electric machines 62, 64. In this example, a first speed sensor 120 senses a speed of the fan shaft 74, a second speed sensor 122 senses a speed of the outer shaft 50 and a third speed sensor 124 senses a speed of the inner shaft 40. Each of the sensors 120, 122 and 124 may be of any configuration that provides information indicative a speed of the respective rotating component. The FADEC 70 and aircraft computer 110 utilized the information to adjust operation and power input to maintain and/or adjust a speed of the fan section 22. It should be appreciated, that the control system 66 may be part of a separate engine controller, integrated as part of the FADEC 70 or any other aircraft controller 110.

The example engine 20 is operated through the gear system 48 to provide several different power inputs to drive the fan section 22. A combination of a first rotational input from the high speed spool 32 into the differential carrier 84 and a second rotational input from the low speed spool 30 through the input gear 80 drives the fan section 22 at a speed different than a speed of both the high speed spool 32 and the low speed spool 30 responsive to the first rotational input and the second rotational input. The first electric machine 62 may be operated to input additional power to the fan shaft 74 and the second electric motor 64 can be operated to input an additional rotational input into the high speed spool 32. The speed of the fan section 22 may therefore be controlled by varying rotational inputs from each of the electric machines 62, 64.

The disclosed engine 20 is only one possible embodiment that may be implemented within the scope of this disclosure. Other configurations of the gear system 48 that enable transfer of power between spools 30, 32 and the electric machines 62, 64 are within the contemplation of this disclosure.

The gear system 48 provides the differential gear system 76 that enables transfer of power between spools 30, 32 to enable faster responses from the fan section 22 and other systems of the engine 20.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbofan engine comprising:
   a fan section including a plurality of fan blades;
   a first spool including a first turbine section;
   a second spool including a second turbine section;
   a first electric machine;
   a second electric machine; and
   a gear system coupled between the first spool, the second spool, the first electric machine, the second electric machine and the fan section for driving the fan section, wherein the gear system comprises a differential gear system including a plurality of spider gears supported in a differential carrier, a fan output gear driven by the plurality of spider gears, a first input shaft configured to drive the differential carrier and an input gear coupled to drive the plurality of spider gears.

2. The turbofan engine as recited in claim 1, wherein the first input shaft is coupled to the first spool and the input gear is coupled to the second spool.

3. The turbofan engine as recited in claim 2, wherein the gear system includes an epicyclic gear box including a sun gear driven by a first spool, the sun gear coupled to drive a plurality of planet gears supported within a carrier and a ring gear circumscribing the plurality of planet gears and an output of the epicyclic gear box coupled to drive the differential carrier.

4. The turbofan engine as recited in claim 3, wherein the ring gear is fixed to a static engine structure and the carrier provides the output to drive the differential carrier.

5. The turbofan engine as recited in claim 3, wherein the carrier is fixed to a static engine structure and the ring gear provides the output to drive the differential carrier.

6. The turbofan engine as recited in claim 4, wherein the fan section includes a fan shaft coupled to the fan output gear and the first electric machine.

7. The turbofan engine as recited in claim 5, wherein the second electric machine is coupled to the first spool.

8. The turbofan engine as recited in claim 7, wherein the first electric machine is an electric motor configured to drive the fan shaft and the second electric machine is an electric motor configured to drive the first spool.

9. The turbofan engine as recited in claim 8, including an electrical bus electrically coupled to the first electric machine and the second electric machine.

10. The turbofan engine as recited in claim 9, wherein the electrical bus includes an AC Bus and a DC Bus.

11. A turbofan engine comprising:
    a fan section including a fan shaft and a plurality of fan blades;
    a high speed spool including a high pressure turbine section;
    a low speed spool including a low pressure turbine section;
    a differential gearbox including a plurality of spider gears supported in a differential carrier, the fan shaft driven by the plurality of spider gears and an input gear driven by the low speed spool;

an epicyclic gearbox including a sun gear driven by the high speed spool, the sun gear driving a plurality of intermediate gears supported within a carrier and a ring gear circumscribing the plurality of intermediate gears, wherein the epicyclic gearbox includes an output configured to drive the differential carrier;

a first electric machine coupled to the fan shaft; and a second electric machine coupled to the high speed spool.

12. The turbofan engine as recited in claim 11, wherein the ring gear is fixed to an engine static structure and the carrier is coupled to drive the differential carrier.

13. The turbofan engine as recited in claim 11, wherein the carrier is fixed to an engine static structure and the ring gear is coupled to drive the differential carrier.

14. The turbofan engine as recited in claim 11, including a low pressure compressor coupled to fan shaft to rotate at a speed common with the fan section.

15. The turbofan engine as recited in claim 11, including a first tower shaft coupling the first electric machine to the fan shaft and a second tower shaft coupling the second electric machine to the high speed spool.

16. The turbofan engine as recited in claim 15, including a first clutch for selectively decoupling the first electric machine from the fan shaft and a second clutch for selectively decoupling the second electric machine from the high speed spool.

17. A method of operating a turbofan engine comprising:
coupling a fan shaft gear to a plurality of spider gears of a differential gearbox;

supporting the plurality of spider gears with a rotatable differential carrier;

coupling a first spool to drive the rotatable differential carrier and a second spool to an input shaft configured to drive the plurality of spider gears; and driving a fan section through the fan shaft gear with a combination of a first rotational input from the first spool into the differential carrier and a second rotational input from the second spool to the input shaft, wherein the fan section is driven at a speed different than a speed of the first spool and the second spool responsive to the first rotational input and the second rotational input.

18. The method as recited in claim 17, including coupling a first electric motor to the fan shaft and providing a rotational input into the fan shaft independent of the first spool and the second spool.

19. The method as recited in claim 18, including coupling a second electric motor to the first spool and providing a rotational input into the first spool.

20. The method as recited in claim 19, including providing a third rotational input with the first electric motor to drive the fan shaft in the absence of the first rotational input from the first spool and the second rotational input from the second spool.

21. The method as recited in claim 19, including controlling a speed of the fan by varying a rotational input from one or both of the first electric motor and the second electric motor.

* * * * *